Sept. 2, 1941.   H. E. KETTLEWELL   2,254,964
INSULATING MEANS FOR HEATED BODIES
Filed Oct. 19, 1938
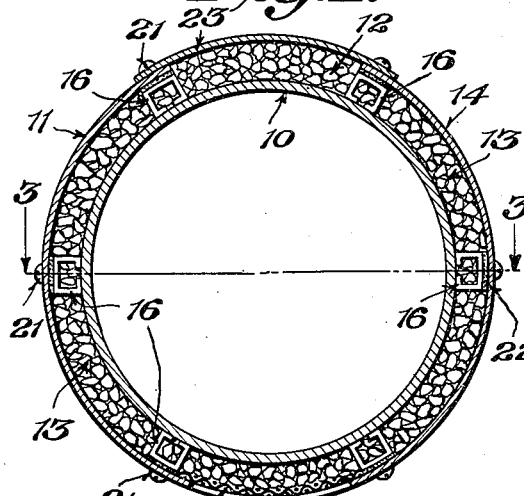
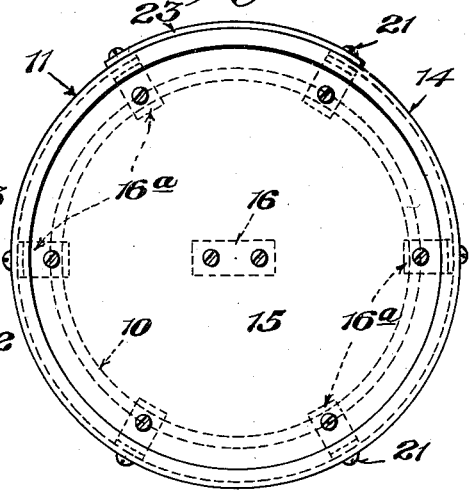
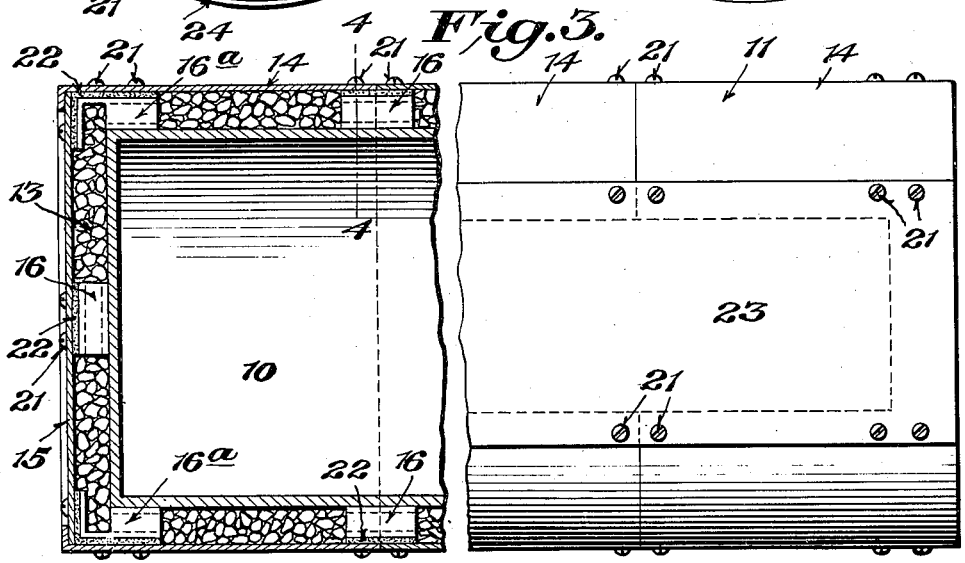
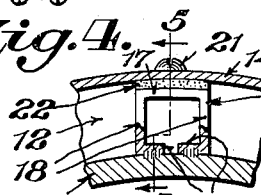
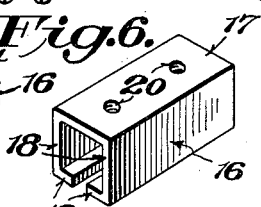
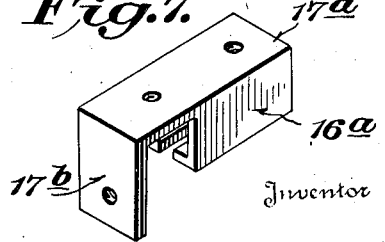
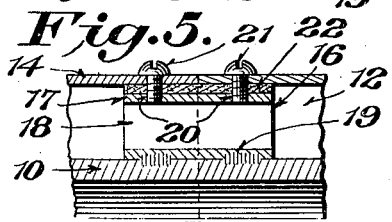
Inventor
Harry E. Kettlewell,
Attorneys Patented Sept. 2, 1941

2,254,964

UNITED STATES PATENT OFFICE 2,254,964

INSULATING MEANS FOR HEATED BODIES

Harry E. Kettlewell, Findlay, Ohio

Application October 19, 1938, Serial No. 235,917

3 Claims. (Cl. 220—15)

The present invention relates to insulating means for heated bodies, such as tanks, furnaces, boilers and other heated surfaces, and the invention aims generally to improve existing constructions permitting the insulation of such bodies with expanded mica.

Expanded mica, produced by subjecting ground mica to an expanding heat of approximately 2200 degrees F. in a direct fire furnace, is a highly efficient insulating medium, particularly adaptable to an insulating medium for outside installations exposed to the weather, because it is a mineral product.

Heretofore, expanded mica has been used as a lagging for heated bodies, by mixing it with a plastic cement, and manually spreading the compound over the heated surface. Usually a textile covering, such as canvas, is applied, which may be coated with a waterproofing compound to protect the expanded mica composite from the weather. This manner of applying expanded mica as an insulation, while effective, has been so costly as to seriously limit its application in actual use.

My invention aims to improve the means for the use of expanded mica in insulating heated bodies, particularly those which are exposed to the weather, by providing a highly efficient inexpensive installation which will effectively insulate the body against rapid heat losses, but also, as well, provide one that may be economically installed and maintained in service.

The nature of the invention will be more fully understood by reference to the accompanying drawing illustrating one manner of practicing the invention.

In the drawing—

Fig. 1 is a cross section of the improved insulating means as applied to a circular heated body;

Fig. 2 is an end view thereof;

Fig. 3 is a side view, partly broken away in section, illustrating the insulating means applied to a cylindrical body, as for example a tank;

Fig. 4 is an enlarged fragmental section taken on the line 4—4 of Fig. 3;

Fig. 5 is a detail sectional view taken on the line 5—5 of Fig. 4;

Fig. 6 is a detail perspective view of one form of spacing lug; and

Fig. 7 is a detail perspective view of one form of spacing lug for spacing the casing from both the sides and ends of the body.

The heated body which is to be insulated is indicated in the drawing at 10, and may be any body of desired shape, rectangular or cylindrical, and constructed of wood, metal or masonry. The illustrated embodiment indicates a cylindrical metal body 10.

A casing 11 is constructed around the body 10 and is secured in spaced relation thereto, affording therebetween an insulating space 12 into which a quantity of loose expanded mica 13 may be poured. The casing 11 may be of any suitable material, such as wood, board, canvas or metal, but preferably metal is used when the installation is located in the open, subject to weather.

As herein illustrated, the casing 11 may be composed of a cylindrical shell composed of a plurality of curved metal side sheets 14, and end sheets 15 (Figs. 2 and 3), which advantageously may be pre-fabricated to the desired size, according to the size of the installation to be made. Secured to the inner face of these sheets 14 and 15 are spacing lugs 16 serving to space the sheets from the surface of the heated body. These lugs may be of pressed sheet metal, as illustrated in Figs. 6 and 7, or they may be of other suitable shape, as for example of short sections of L-, T- or Z-shaped bars.

As herein illustrated, the spacing lugs 16 (Figs. 4, 5 and 6) may be formed of sheet metal bent to substantially rectangular form, providing a supporting surface 17, legs 18 and feet 19. The supporting surface may be tapped as at 20 for the reception of screws 21 or other suitable fastenings, by means of which the metal casing 14 may be fastened securely to the lugs 16, while permitting the positioning therebetween of an insulating washer 22 of suitable non-heat-conducting material, for example asbestos, cork and the like.

In the event that the heated body is of metal, the lugs 16 may be secured at spaced intervals along its surface, as by welding the feet 19 thereto, and later applying the casing sheets 14. When, however, the heated body 10 is of some non-metallic material, as for example, brick, the lugs may be fastened only to the sheets 14, 15 and merely rest against the body 10.

The end lugs 16a (Figs. 3 and 7) may have an extended supporting surface 17a and an inturned end 17b, suitably tapped as shown to permit the end casing plate 15 to be secured thereto.

The upper portion of the casing 11 may be, and preferably is open and may be closed by a separate plate 23 removable in whole or in sections. This permits of ready access to the interior of the chamber 12 for periodic inspection and filling, In providing a loose fill insulation for many heated bodies located in the open, subject to weather, serious objections are often encountered by the presence of condensation within the insulating chamber, particularly when subjected to substantial changes in temperature on the outside. To overcome this objection, I may construct a portion or all of the casing surface as a ventilating medium, as for example, coarse canvas, wire screen and the like. In the illustrated embodiment a lower section of the casing may be formed of screening as indicated at 24.

Advantages of my invention reside in the provision of a non-heat-conducting casing surrounding and spaced from the heated body, permitting a loose fill of expanded mica to be poured into the insulating chamber. This permits of the use of expanded mica, in its most efficient state, i. e. without mixing with a plastic cement which is less efficient as a heat insulator. Further advantages of the invention reside in the fact that the cost of installation and upkeep is considerably less than the prior practice above referred to.

Having described a preferred form of the invention, I claim:

1. Means for insulating a cylindrical heated body comprising a plurality of longitudinally extending open-ended channel-shaped spacing members secured to said body in circumferential rows extending around the body providing circumferentially aligned hollow supports with intermediate unobstructed insulating spaces, a plurality of sectional casing sheets secured to said spacing members and extending circumferentially of said body leaving an open filling opening between adjacent spacing members along one longitudinal side portion of said body, a loose fill of granular insulation adapted to be poured through said filling opening for filling the spacing members and said chamber between said body and casing, and longitudinally disposed cover means removably secured to said adjacent spacing members along the longitudinal side portion to provide a closure for said filling opening, a portion at least of said casing sheets being of air-pervious material to provide ventilation to said chamber and prevent condensation of moisture therein.

2. Means for insulating a cylindrical heated body comprising a plurality of longitudinally extending open-ended channel-shaped spacing members secured to said body in circumferential rows extending around the body providing circumferentially aligned hollow supports with intermediate unobstructed insulating spaces, a plurality of sectional casing sheets secured to said spacing members and extending circumferentially of said body leaving an open filling opening between adjacent spacing members along one longitudinal side portion of said body, a loose fill of granular insulation adapted to be poured through said filling opening for filling the spacing members and said chamber between said body and casing, and longitudinally disposed cover means removably secured to said adjacent spacing members along the longitudinal side portion to provide a closure for said filling opening, and additional insulating means disposed between said cover and casing sheets, a portion at least of said casing sheets being of air-pervious material to provide ventilation to said chamber and prevent condensation of moisture therein.

3. Means for insulating a cylindrical heated body comprising a plurality of spacing members secured to said body in circumferential rows extending around the body providing circumferentially aligned supports with intermediate unobstructed insulating spaces, the supports adjacent the ends of said casing having a longitudinally extending supporting surface and spaced foot portion welded to the body, said longitudinally supporting surface extending beyond the foot portion and being angularly bent providing supports spaced from the end of said body, separate cover plates secured to said end supports, a plurality of sectional casing sheets secured to said spacing members and extending circumferentially of said body leaving an open filling opening between adjacent spacing members along one longitudinal side portion of said body, a loose fill of expanded mica insulation adapted to be poured through said filling opening for filling said chamber between said body and casing, and longitudinally disposed cover means removably secured to said adjacent spacing members along the longitudinal side portion to provide a closure for said filling opening, a portion at least of said casing sheets being of air-pervious material to provide ventilation to said chamber and prevent condensation of moisture therein.

HARRY E. KETTLEWELL.